No. 616,222. Patented Dec. 20, 1898.
F. W. COLE.
TELEGRAPH REPEATER.
(Application filed Aug. 5, 1893.)

(No Model.) 4 Sheets—Sheet 1.

Fig. 1.

WITNESSES.
Charles B. Crocker.
Eva S. Rounds.

INVENTOR.
Frederick W. Cole
by B. J. Noyes,
atty.

THE NORRIS PETERS CO., PHOTO-LITHO., WASHINGTON, D. C.

No. 616,222. Patented Dec. 20, 1898.
F. W. COLE.
TELEGRAPH REPEATER.
(Application filed Aug. 5, 1893.)
(No Model.) 4 Sheets—Sheet 2.

No. 616,222. Patented Dec. 20, 1898.
F. W. COLE.
TELEGRAPH REPEATER.
(Application filed Aug. 5, 1893.)

(No Model.) 4 Sheets—Sheet 4.

WITNESSES.
Charles B. Crocker.
Eva S. Rounds.

INVENTOR
Frederick W. Cole.
by B. J. Noyes, Atty.

THE NORRIS PETERS CO., PHOTO-LITHO., WASHINGTON, D. C.

UNITED STATES PATENT OFFICE.

FREDERICK W. COLE, OF NEWTON, MASSACHUSETTS.

TELEGRAPH-REPEATER.

SPECIFICATION forming part of Letters Patent No. 616,222, dated December 20, 1898.

Application filed August 5, 1893. Serial No. 482,447. (No model.)

*To all whom it may concern:*

Be it known that I, FREDERICK W. COLE, of Newton, county of Middlesex, State of Massachusetts, have invented an Improvement in Telegraph-Repeaters, of which the following description, in connection with the accompanying drawings, is a specification, like letters and figures on the drawings representing like parts.

This invention has for its object to improve and simplify the construction of repeaters or telegraph instruments by which electric signals received over any one of a number of circuits, all connected with said repeating instrument, are automatically repeated over the remaining circuits, said instruments being employed in fire-alarm systems for the purpose of repeating the signals that may be received from a signal-box over one circuit over all the remaining circuits of the system. The signals are usually produced by a motor-driven signal-wheel, which opens and closes a normally-closed circuit, and it is necessary that the repeating instrument should be so constructed and arranged that the moment a box begins to transmit its signal over one of the circuits the repeating instrument will be wholly under the control of that circuit until the signal is completed, so that in case it should be attempted to transmit a signal over another circuit before the first signal is completed in the orignal circuit there would be no interference between the two signals. It is also important that in case two circuits should be operated simultaneously only one should be allowed to continue to operate the repeater. It is further necessary in case an accidental break occurs in one of the circuits that the repeater should not be rendered inoperative so far as the remaining circuits are concerned, even though that circuit should remain deranged.

In accordance with this invention a series of circuit-controllers, (herein shown as circuit-breakers,) one for each circuit, are adapted to be operated by mechanism herein termed the "repeating-train" to thereby repeat the different signals received, and said repeating-train is normally wound and held at rest by a suitable locking-lever. A receiving-electromagnet is included in or connected with each signaling-circuit and is responsive to the signals transmitted over its circuit. The armatures of these electromagnets are connected by links to a like number of operating-levers, which are so placed with relation to the locking-lever of the said repeating-train that the operation of any one of them will operate said locking-lever to release and thereafter lock the said repeating-train. There are further provided a number of controlling-levers, corresponding to the number of operating-levers and circuit-controllers, which have two important functions—viz., to serve as a means of holding or locking all the operating-levers except the particular one which is being operated and also to serve as a means of placing all the circuit-controllers except the one included in the circuit over which the signal is being received in condition to open and close by the repeating-train, to thereby repeat the signal over all the other circuits. The means provided for operating said controlling-levers is herein termed the "locking-out train." A timed train, which is governed or operated by the repeating-train, is also provided, which controls the said locking-out train, keeping said locking-out train in its abnormal position for a definite length of time after an impulse has been received from any circuit, it being so regulated as to permit the locking-out train to resume its normal position after a period of time has elapsed which is of longer duration than any break which would occur on a line during the transmission of any signal from a signal-box. A number of annunciators are provided, one for each circuit, and so located with respect to the operating-levers that upon the first operation or movement of the operating-levers the annunciators will be operated to thereby indicate which circuit is being operated. A manual setback is provided for said annunciators.

Figs. 3, 4, and 5, enlarged details taken from the same side view as Fig. 1, showing several of the essential parts in different positions, to be referred to; Fig. 7, a detail of the locking-lever, and Fig. 8 a detail of the supporting-plate for the operating and controlling levers.

The receiving-magnet $a$, commonly called the "repeater-magnet," and of which there is one for each circuit, is represented as being connected by dotted lines in each circuit with battery B, and a signal-box or circuit-breaking device is also represented in diagram at C, (see Figs. 1 and 2,) said circuit being connected at the repeating mechanism to the contact-carrying spring $d'$ and contact-plate $d^2$, which are mounted, respectively, upon the insulation-blocks $d^3$ and $d^4$.

The contact-carrying springs $d'$ and contact-plate $d^2$ constitute the repeating circuit-controller, and is preferably used to open and close the circuit.

Figure 6:
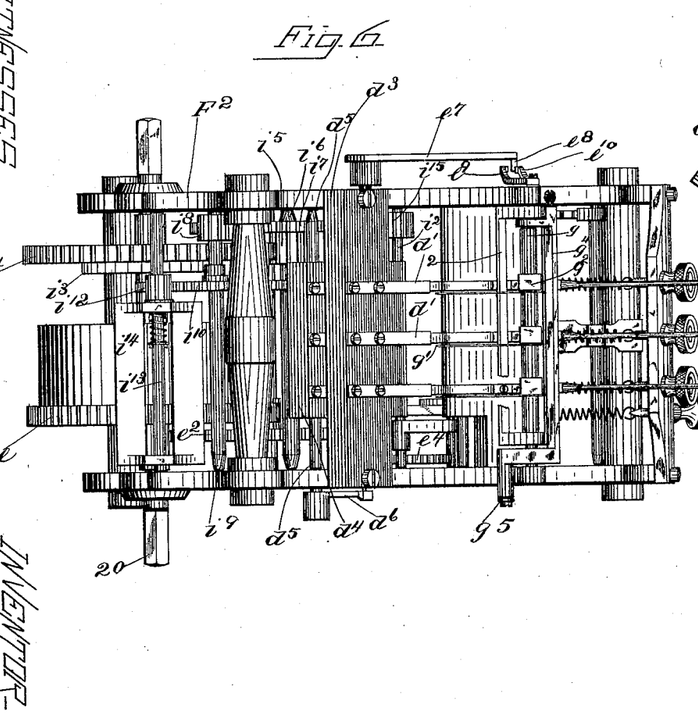
Fig. 6, a plan view of the repeater shown in Fig. 1.

There will be as many circuit-controllers as there are circuits connected with the repeater, and they will preferably be arranged side by side, as shown in Fig. 6, three being herein represented.

The block $d^3$, bearing the contact-carrying springs $d'$, is rigidly supported by the front and back plates F' F² of the repeating instrument, and the block $d^4$, bearing the contact-plates $d^2$, is secured to a rock-shaft $d^5$, having its bearing in the frame, one end of said shaft having secured to it an arm $d^6$, which extends downwardly and has its lower end forked. (See Fig. 1.)

Figure 1:
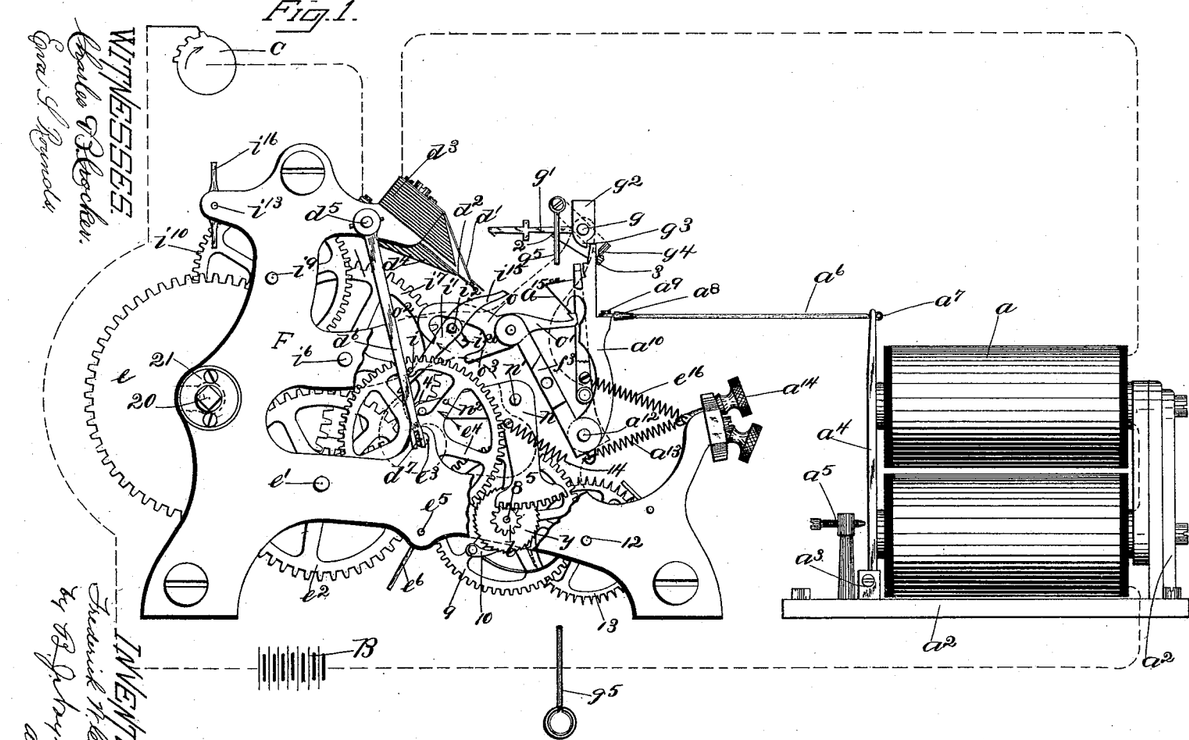
Figure 1 shows in side elevation a repeater embodying this invention, the parts thereof being in their normal position of rest.
Figure 2:
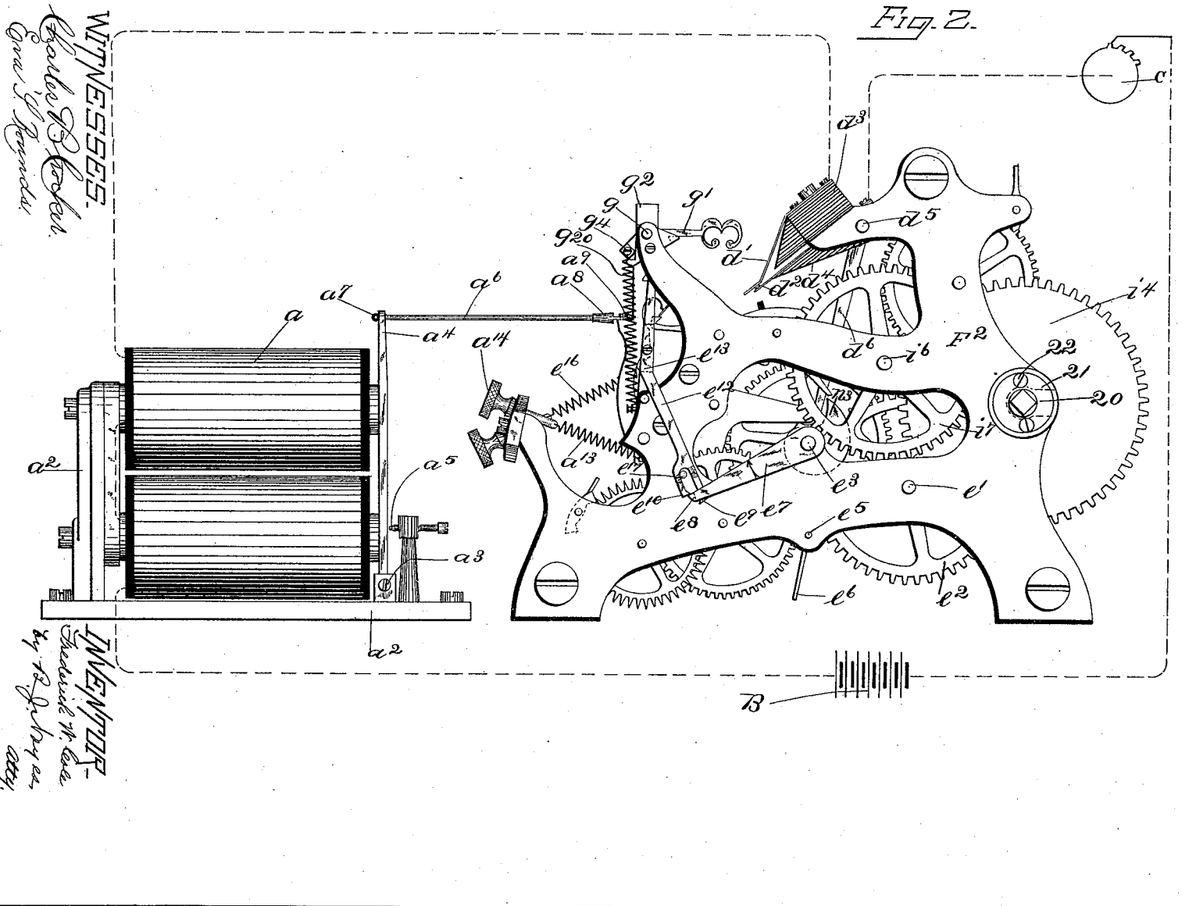
Fig. 2 is an opposite side view of the repeater shown in Fig. 1, with the parts in the same position.

An eccentric-pin $d^7$, carried by the shaft $e^3$ of the repeating-train, works within the forked end of the arm $d^6$, moving said arm a short distance during each revolution of the shaft $e^3$, sufficiently to move the contact-points $d^2$ toward and from the contact-points $d'$.

The repeating-train consists of the main toothed wheel $e$, loosely mounted upon its shaft 20 and engaging a pinion secured to a shaft $e'$, which has secured to it a toothed wheel $e^2$, which engages a pinion secured to the shaft $e^3$, which has secured to it a toothed wheel $e^4$, which engages a pinion upon the shaft $e^5$, which carries a timing-fan $e^6$, frictionally connected to said shaft.

The side plates supporting the main shaft 20 are cut away to present keyhole-slots, (see dotted lines,) and flanged bushings 21 are fitted into the circular portions of said slots and secured to the said plates by screws 22. By means of these detachable bushings the main shaft is easily removable.

Upon the back or rear end of the shaft $e^3$ of the repeating-train is secured an arm $e^7$, having upon its end an inwardly-projecting detent $e^8$, which engages the locking-detents $e^9$ and $e^{10}$, formed upon the lower end of an arm $e^{12}$, projecting from the locking-lever $e^{13}$, which is pivoted at $e^{14}$. The locking-lever $e^{13}$ (see Fig. 7) is made as a rectangular frame, fastened at each end to its shaft, and pivoted at $e^{14}$, its upper cross or connecting piece or bar $e^{15}$ extending along in juxtaposition to the upper end of a series or group of operating-levers $a^{10}$, to be described, being normally held in position by a spring $e^{16}$ and limited in its motion by the stop-pin $e^{17}$, which is secured to the frame between the detents $e^9 e^{10}$.

The magnet $a$ is supported upon a suitable frame or stand $a^2$, to which is pivoted at $a^3$ the armature $a^4$, which is provided with a suitable adjustable back-stop $a^5$. The upper end of the armature is extended above the top of the magnet, as shown, and has near its upper end a small hole through it, through which a connecting rod or link $a^6$ freely passes, a suitable retaining-head $a^7$ being formed upon the end of said rod to prevent it passing through the hole in the extension of the armature. The opposite end of said rod or link is threaded to allow adjustment and is screwed into a coupling $a^8$, which is connected by a pivot or body screw $a^9$ to one of the operating-levers $a^{10}$. The armatures of the other magnets will be similarly connected to the other operating-levers.

By connecting the armatures of the magnets with the operating-levers by rods or links, as shown, a large number of operating-levers may be arranged very close together or side by side, and thereby insure compactness of parts not otherwise obtainable, and, furthermore, by so doing the capacity of the machine may be greatly increased without detriment to its successful operation. By providing the armatures with extensions the connecting-rods may be elevated above the magnets, so that in case a large number of magnets are used the rods connected to the armatures of the rearmost ones may pass over those ahead of it.

The operating-levers $a^{10}$ are pivoted in slots or recesses formed in the lower end of a frame $f^3$, (see Fig. 8,) which is secured between the plates F' F², and at the lower ends of said operating-levers hooks are attached, to which the tension-springs $a^{13}$ are connected, the opposite ends of said springs being connected to the adjusting-screws $a^{14}$.

Figures 3, 4, 7, 8:
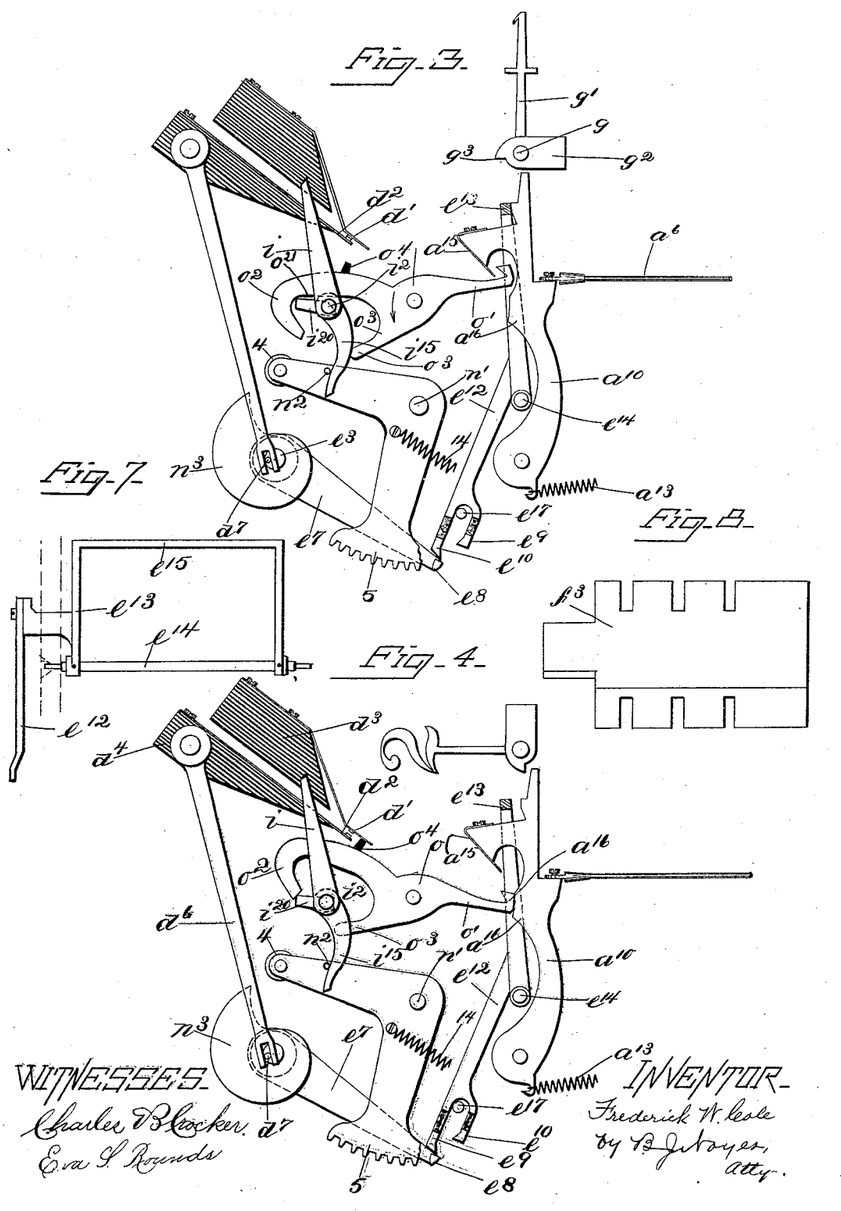

Just above the operating-levers $a^{10}$ a series or group of annunciators $g'$ are loosely mounted upon a shaft $g$, one corresponding to each circuit, said annunciators consisting of figures denoting the circuit secured to counterbalanced blocks $g^2$, provided with projections $g^3$, so arranged in the path of movement of the operating-levers $a^{10}$ that they in moving will strike said projections $g^3$ and cause the annunciators or figures to be moved into an upright position, as shown in Fig. 3.

The counterbalanced blocks $g^2$ when thrown over rest upon a cross-bar $g^4$, supported by arms loosely mounted upon the rod $g$, and to one of said arms a hand-operative rod $g^5$ is attached, by which the said cross-bar may be raised on the rod $g$ as a pivot to restore the annunciator, a spring $g^{20}$ acting to restore said bar. Another frame is secured to said rod $g$, having two parallel cross-bars 2 3, upon one of which, as 2, the figured portion of the annunciator normally rests, while the other, as 3, serves as a stop for the operating-levers $a^{10}$.

As one of the armatures $a^4$ is retracted the operating-lever $a^{10}$, connected with it, is moved by its actuating-spring $a^{13}$ and bearing against and moving the locking-lever $e^{13}$. Said locking-lever turning on its pivot causes the locking-detent $e^{10}$ to disengage the detent $e^8$ on the arm $e^7$ of the repeating train, and said arm $e^7$ thus released makes one revolution, when the detent $e^8$ strikes the detent $e^9$. The arm $e^7$ remains in this position until the armature is attracted and the locking-lever permitted to resume its normal position, when the detent $e^9$ passes by the detent $e^8$ and the latter is permitted to again engage the detent $e^{10}$, thereby resuming its normal position.

Fixed to the wheel $e^4$, which is secured to the shaft $e^3$, carrying the arm $e^7$, is a pin $i$, which engages an arm $i'$, secured to a shaft $i^2$ of the locking-out train, said pin thereby serving as a stop for said locking-out train.

The main driving-wheel $e$ of the repeating train, referred to as loosely mounted upon its shaft, is rigidly connected to the drum containing the main spring, and the outer end of said spring is connected with the drum, while its inner end is connected with the winding-shaft. A ratchet-wheel $i^3$ is fixed to said winding-shaft, which is engaged by a suitable pawl carried by the toothed wheel $i^4$, mounted loosely on said shaft and constituting the main driving-wheel of the locking-out-train. The wheel $i^4$ engages a pinion $i^5$ on the shaft $i^6$, (see Fig. 2,) said shaft having fixed to it a toothed wheel $i^7$, which engages a pinion $i^8$ on the shaft $i^9$, which carries a toothed wheel $i^{10}$, which engages a pinion $i^{12}$ on the shaft $i^{13}$, carrying the fan $i^{14}$, frictionally connected therewith. The toothed wheel $i^7$ also engages a pinion $i^{15}$ on shaft $i^2$, rotating said shaft when the train is released by the removal of the stop-pin $i$. The shaft $i^2$, as herein shown, has a rib $i^{20}$ projecting radially for a short distance, said rib extending nearly the entire length of the shaft. Fixed to said shaft $i^2$ at the side of the arm $i'$, but projecting in an opposite direction, is an arm $i^{15}$, and a bell-crank lever $n$, which forms a coöperative part of a timing-train, is secured to a shaft $n'$, one arm of said lever having a pin $n^2$, which obstructs the path of movement of said arm $i^{15}$ when the locking-out train has been released and which holds said train until removed from its engagement with said arm $i^{15}$.

Figure 5:
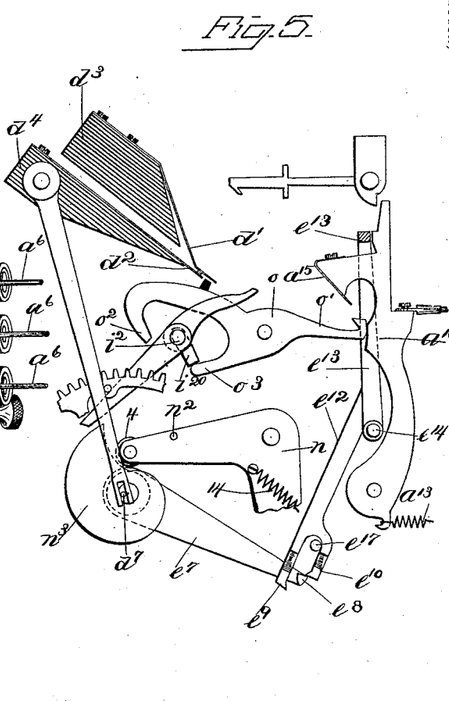

Secured to the shaft $e^3$ of the repeating-train is a cam-disk $n^3$, which during its revolution strikes a roll or pin 4, projecting from one side of one arm of the bell-crank lever $n$, operating to turn said lever in one direction from the position shown in Figs. 1 and 5 into the position shown in Figs. 3 and 4. Formed upon the other arm of said bell-crank lever $n$ of the timing-train is a toothed sector 5, which engages a pinion 6, secured to a ratchet-wheel 7, mounted loosely upon the shaft 8, which shaft supports rigidly a toothed wheel 9, carrying a pawl 10, which engages said ratchet-wheel, and said toothed wheel 9 engages a pinion on a shaft 12, carrying an escape-wheel 13, having a suitable pallet. The actuating-spring 14 of this timing mechanism or train is shown as connected to one arm of said bell-crank lever $n$, its other end being connected to a fixed point. Each time the repeating-train is released by its locking-lever and the shaft $e^3$ makes a single revolution the cam $n^3$ will set back the timing-train, as shown in Figs. 3 and 4, to abnormal position and the pin $n^2$ on the bell-crank lever will continue to engage the arm $i^{15}$ on shaft $i^2$, and thereby hold the locking-out train until such time as the timing-train is permitted to resume its normal condition, which requires a longer time than the longest break in any signal, and at the end of such time the bell-crank lever will be restored to its normal condition and the pin $n^2$ moved out of engagement with the arm $i^{15}$, permitting the shaft $i^2$ to complete its revolution, at which time the arm $i'$ on said shaft will be engaged by the pin $i$ on the wheel $e^4$ of the repeating-train.

A set of controlling-levers $o$ are pivoted to the upper edge of the frame $f^3$, there being one controlling-lever for each operating-lever $a^{10}$, and they are herein shown as arranged in the same vertical plane. These controlling-levers are all made substantially alike, each consisting of a plate having a projection $o'$, with a hooked end on one side of its pivot and a weighted portion upon the opposite side of its pivot cut away or recessed, as shown, to present a hook-shaped or bent finger at one end of the recess and another finger $o^3$ at the opposite end of the recess. The recessed portion of the plate receives the shaft $i^2$, having thereon the longitudinal rib or projection $i^{20}$, while the hooked end $o'$ coöperates, as will be described, with a spring-tongue $a^{15}$, secured to a projection upon the operating-lever $a^{10}$. An insulating projection $o^4$ is located upon the upper edge of each plate or controlling-lever $o$, which at times engages the uppermost contact-spring $d'$ of the circuit-controller above it, as will be hereinafter set forth.

In Fig. 1 the controlling-levers are represented in their normal position, they being held by their hooked ends $o'$ bearing against the lower ends of the tongues $a^{15}$ of the operating-levers $a^{10}$.

When one of the armatures retracts and its operating-lever $a^{10}$ is correspondingly moved by means of its actuating-spring, the tongue $a^{15}$ will pass by the hook on the end of the arm $o'$, permitting said hooked end to rise in the recess back of the tongue provided for it, (see Fig. 3,) and at such time the opposite end of said lever falls until it rests upon the shaft $i^2$ or is otherwise supported. The repeating-train is also at such time released by the locking-lever $e^{13}$, the shaft $e^3$ will make a single revolution, and the arm $i'$ of the locking-out train being thereby released the shaft $i^2$ will be turned until the arm $i^{15}$ strikes the pin $n^2$ on the bell-crank lever of the timing-train, which by means of the cam-disk $n^3$ has been brought into position to obstruct the movement of said arm. The rib or projection $i^{20}$ on said shaft $i^2$ at such time occupies a position in the recess in the plate or controlling-lever $o$, as shown in Fig. 3. When the plate is in this position, the operating-lever $a^{10}$ is free to vibrate to correspond to the movements of the armature during the reception of the signal and until the completion of said signal. The other controlling-levers $o$ during such time operate differently from the aforesaid controlling-lever in that when the shaft $i^2$ is turned the rib or projection $i^{20}$ thereon strikes the ends of the bent fingers $o^2$, and thereby lifts the levers on their pivots until the arm $i^{15}$ strikes the pin $n^2$, as shown in Fig. 4, and at such time the controlling-levers $o$ will be raised sufficiently for its insulating projections $o^4$ thereon to engage the uppermost contact-springs $d'$ and lift them free from contact with the plates $d^2$, upon which they normally rest, and thereby hold open their respective circuits. At such time the hooked ends $o'$ of said levers are brought into engagement with projections $a^{16}$ upon the operating-levers $a^{10}$, mechanically holding said levers at rest in their normal positions, and thereby non-responsive to the action of the armatures of the magnets in the circuits over which the signal is being repeated. The remaining controlling-levers $o$, being thus brought into and held in such position upon the reception of the first impulse, will remain in such position until the bell-crank lever is restored to its normal position, and thereby releases the arm $i^{15}$, and, as previously stated, a longer time is required for such operation than the longest break in any signal, and it is obvious that such an interval of time will not occur until the completion of the signal, the parts having been brought into such position upon the first retraction of the armatures of one of the magnets. It will be observed that each time the locking-lever $e^{13}$ is vibrated by the vibrating operating-lever $a^{10}$ the shaft $e^3$ will be permitted to make one complete revolution, and during such revolution will, by means of the eccentric-pin $d^7$ thereon, move the arm $d^6$ and rock the shaft $d^5$, carrying the contact-plates $d^2$, thereby momentarily closing them upon or against the contact-springs $d'$. The several circuits over which the signal is being repeated are thus kept open at all times, except for the short intervals of time when the contact-plates $d^2$ are brought into engagement with the contact-pens $d'$ by means of the eccentric $d^7$ on shaft $e^3$. It will be seen, however, that the particular contact-spring $d'$ corresponding with or included in the circuit upon which the signal is being received is not raised free from contact with the contact-plate $d^2$ by the controlling-lever $o$, as are the other contact-springs, and hence the contact-plate $d^2$ when moved by the rock-shaft simply raises said contact-spring $d'$, maintaining a continuous contact therewith. After the signal has been received and a sufficient length of time elapses—viz., an interval of time longer than the longest break in any signal—the arm $i^{15}$ will be released and the shaft $i^2$ will complete its revolution. During such time the rib or projection $i^{20}$ thereon, which occupies a position within the recess of one of the controlling-levers $o$, will positively raise said lever a short distance until the hooked end $o'$ is removed from the recess back of the tongue $a^{15}$, when it can resume the position shown in Fig. 1. And as to the remaining controlling-levers the rib $i^{20}$ immediately passes by the ends of the bent fingers $o^2$, turns within the recesses in the plates, and strikes the fingers $o^3$, thereby positively moving said plates, as shown in Fig. 5, sufficiently for the contact-springs $d'$ to return to their normal position, closing upon the contact-plates $d^2$, after which said controlling-levers will return to their position shown in Fig. 1 by gravity.

If any one of the circuits should be accidentally or otherwise broken and remain so for a longer time than an ordinary break in any signal, one of the operating-levers $a^{10}$ will be moved and the different controlling-levers $o$ consequently moved, as above described, when receiving a signal; but as soon as the bell-crank lever of the timing-train resumes its normal position, as it will do when the circuit remains broken for a longer time than the longest break in any signal, the shaft $i^2$ will be released and permitted to complete its revolution, as before stated, and the rib $i^{20}$ thereon, which occupies a position in the recess of one of the controlling-levers, as shown in Fig. 3, will during its revolution, by acting upon the edge $o^{21}$, raise said controlling-lever into the position shown in Fig. 5, and the end $o'$ thereof will during such movements positively or mechanically return the operating-lever $a^{10}$, as at such time the magnet being demagnetized is incapable of returning said lever. The controlling-lever when so raised to restore or return the operating-lever is not raised high enough to open the circuit-controller $b'$ $b^2$.

The end $o'$ of the controlling-lever which bears upon or against the operating-lever to positively return it, as aforesaid, will remain in such engagement by friction, as the pressure exerted against it by the spring $a^{13}$ acting on the lever is sufficient to overcome the weighted portion of the controlling-lever, and therefore said controlling-lever will continue to occupy such an abnormal position until the operating-lever is drawn forward by the attraction of the armature of the magnet when the line has been repaired. It will be observed that during the time one of the controlling-levers $o$ is thus acting to positively or mechanically hold its operating-lever the remaining operating-levers and controlling-levers are in condition to operate, and the same result follows even if more than one circuit should be deranged.

Whenever two signals are received at the same time from different circuits in such manner that their first impulses are received simultaneously, two of the operating-levers $a^{10}$ will be moved, setting free their corresponding controlling-levers $o$, just as before described when one signal was being received, and the locking-lever of the repeating-train will be moved by said operating-levers $a^{10}$ successively as long as they operate in unison; but as soon as one of said operating-levers is moved and the other remains at rest, or, in other words, as soon as said levers operate out of unison the locking-lever will be held by that operating-lever which remains at rest, and if said operating-levers then operate alternately the locking-lever will be held continuously in its abnormal position by one or the other operating-lever, and after it has been so held for a time sufficiently long for the timing mechanism to resume its normal position the operative parts of the repeater will also be immediately restored to their normal position. After the parts have been so restored the first impulse received from either circuit will set the repeater in condition to receive the signal from that circuit to the exclusion of the other circuit which is being operated, and this signal so received will be repeated over all the other circuits. In an instance of this kind confusion will arise in the first round of the signal; but the succeeding rounds of one of the signal-boxes will be correctly received.

I claim—

1. In a repeater, a train, a locking-lever therefor, a series of operating-levers, one for each circuit connected with the repeater, movement of any one of which will operate said locking-lever to release the train, independently-movable locking devices, one for each operating-lever, a locking-out train adapted to coöperate with said locking devices when in their normal positions, and means for moving any of said locking devices from its normal position, to a position in which it cannot be operated by said locking-out train, substantially as described.

2. In a repeater, a train, a locking-lever therefor, a series of operating-levers, one for each circuit connected with the repeater, movement of any one of which will operate said locking-lever to release the train, independently-movable locking devices, one for each operating-lever, a locking-out train in the path of movement of which said locking devices are normally held by engagement with said operating-levers, any one of said locking devices automatically moving from its normal position to a position in which it cannot be operated by said locking-out train upon the operation of its corresponding operating-lever, substantially as described.

3. In a repeater, a series of operating-levers, one for each circuit connected with the repeater adapted to respond to changes therein, a repeating-train and a locking-out train controlled by said repeating-train, a locking device for each operating-lever having engaging portions for both the operating-lever and the locking-out train respectively, and adapted to be released by the first movement of the operating-lever, and to thereafter move automatically to a predetermined position independently of the operating-lever or locking-out train, substantially as described.

4. In a repeater, a series of operating-levers, one for each circuit connected with the repeater adapted to respond to changes therein, a repeating-train and a locking-out train controlled by said repeating-train, a locking device for each operating-lever having engaging portions for both the operating-lever and the locking-out train respectively, and adapted to be released by the first movement of the operating-lever, and to thereafter move automatically out of coöperative engagement with said locking-out train, substantially as described.

5. In a repeater, a series of operating-levers, one for each circuit connected with the repeater, each having a stop $a^{15}$ and a projection $a^{16}$, a locking-out train, a locking device for each operating-lever, said locking devices being normally held by said stops $a^{15}$ in the path of engagement with said locking-out train, which latter, when operated, moves them into engagement with said projections $a^{16}$, to thereby mechanically hold said levers, substantially as described.

6. In a repeater, a series of operating-levers, one for each circuit connected with the repeater, each having a stop $a^{15}$ and a projection $a^{16}$, a locking-out train, a locking device for each operating-lever, said locking devices being normally held by said stops $a^{15}$ in the path of engagement with said locking-out train, which latter, when operated, moves them into engagement with said projections $a^{16}$, to thereby mechanically hold said levers, any one of which however is free to move out of said engaging position with the locking-out train upon the initial movement of its corresponding operating-lever, to thereafter permit continued vibration of said operating-lever, substantially as described.

7. In a repeater, a series of operating-levers, a locking-out train, an independent locking device for each operating-lever, each locking device having engaging portions adapted to coöperate with said locking-out train and with its corresponding operating-lever, to be moved by said locking-out train into position to mechanically lock said operating-levers, any one of which locking devices being movable automatically out of coöperative engagement with said locking-out train upon the operation of its corresponding operating-lever, to thereby permit free vibration of said lever, substantially as described.

8. In a repeater, a series of circuit-controllers, a repeating-train for operating them, a locking-lever for said train, a series of operating-levers, one for each circuit connected with the repeater, movement of any one of which will operate said locking-lever to release the train, a locking-out train, an independent pivoted locking device for each operating-lever, one end of which is normally engaged and held by the operating-lever, and the other end of which has portions $o^2$, $o^{21}$, adapted and arranged to coöperate with the locking-out train, the portion $o^2$ being acted upon by said train when its opposite end is engaged by the operating-lever, and the portion $o^{21}$ being acted upon by said train when said locking device is released, substantially as described.

9. In a repeater, a series of circuit-controllers, a repeating-train for operating them, a locking-lever for said train, a series of operating-levers for said locking-lever connected respectively with the armature of the operating-electromagnets, a locking-out train having as a coöperative part of it a rotatable projection, as $i^{20}$, a series of pivoted controlling-levers having bent fingers $o^2$, normally held in the path of movement of the projection $i^{20}$ by the operating-levers, but removed therefrom when released, and also having fingers $o^3$, substantially as described.

10. In a repeater, an operating-lever for each circuit connected with the repeater, responsive to changes in the condition thereof, an independently-movable locking device for each operating-lever, a motor for moving said locking devices to lock the operating-levers, each locking device being normally held by its corresponding operating-lever in a position to be thus operated upon the starting of said motor to lock its operating-lever, but adapted to move automatically when released by its operating-lever to a position in which it is not operated upon the starting of said motor, said locking devices each having a portion adapted to be engaged by said motor to move said locking device into its locking position, means for causing said motor to start at the first impulse of the signal and to stop at the completion of the signal, substantially as described.

11. A repeater having a number of independent operating-levers, one for each circuit connected therewith, and responsive to changes therein, and each adapted by its movement from its normal position to control the operation of the instrument, an electromagnet and armature for each circuit, said operating-levers being connected with said armatures and held by them in normal position, a spring for each operating-lever operating when unopposed to move said operating-levers to abnormal position, an independent locking device for each operating-lever, and means for moving all of said locking devices to their locking positions at each complete operation of the repeater, any or all of said locking devices being held in such locking position by said operating-levers to thereby hold said operating-levers until said levers are otherwise held, substantially as described.

12. In a repeater, an operating-lever for each circuit connected therewith, an independently-movable locking device for each, a locking-out train with which all of said locking devices coöperate, said locking devices having portions which are engaged by said locking-out train at the final movement thereof, whereby all of said locking devices are carried to a position in which they lock their respective operating-levers and remain in such locking position unaffected by subsequent operations of the repeater, and means for retaining said locking devices in such position dependent upon the condition of their respective circuits, substantially as described.

13. In a repeater, an operating-lever for each circuit connected therewith and responsive to changes therein, a repeating-train, a locking-out train controlled by said repeating-train, a pivoted locking device for each operating-lever weighted at one side of its pivot, engaging portions at one end thereof, one of which is engaged by the operating-lever in its normal position and the other when said operating-lever is moved in response to a change in its circuit, allowing said locking device to rock on its pivot, and engaging portions at the opposite end of said locking device adapted to be engaged by the said locking-out train, the coöperation of said train with said engaging portions being dependent upon the position of said locking devices determined by their relation to said operating-levers substantially as described.

14. In a repeater, a series of circuit-controllers, a repeating-train for operating them, a locking-lever for said train, a series of operating-levers arranged adjacent to said locking-lever, a series of electromagnets and armatures therefor, and connecting-rods connecting said armatures with the operating-levers substantially as described.

15. In a repeater, a series of circuit-controllers, a repeating-train for operating them, a locking-lever for said train having a horizontal cross-piece, a series of vertical operating-levers arranged side by side adjacent to said cross-piece, a series of electromagnets and armatures therefor, and connecting-rods connecting said armatures respectively with the operating-levers, substantially as described.

16. In a repeater, a series of circuit-controllers, a repeating-train for operating them, a locking-lever for said train, a series of operating-levers arranged adjacent to said locking-lever, a series of electromagnets and armatures therefor, extensions on said armatures, and connecting-rods connected at one end with said operating-levers and at the other end with the extensions on said armatures, substantially as described.

17. In a repeater, a series of circuit-controllers, one for each circuit adapted to be opened and closed at each operation of the repeating-train, a series of controlling-levers governing the operative positions of said circuit-controllers, and a series of operating-levers, any one of which releases the repeating-train for each impulse, substantially as described.

18. In a repeater, a repeating-train, a locking-lever therefor, a series of circuit-controllers, one for each circuit, adapted to be opened and closed at each operation of the repeating-train, a series of operating-levers, movement of any one of which will operate said locking-lever and release the repeating-train, an independent locking device for each operating-lever, and a locking-out train for moving said locking devices to mechanically hold the operating-levers and retain them while the repeating-train operates the circuit-controllers, said locking devices having portions adapted to engage the circuit-controllers and place them in position to be operated by the repeating-train when moved to lock the operating-levers, substantially as described.

19. In a repeater, a repeating-train, a locking-lever therefor, a series of operating-levers, one for each circuit connected with the repeater, responsive to changes therein, movement of any one of which will release said train, a series of circuit-controllers, one for each circuit adapted to be opened and closed at each operation of the repeating-train, and an independent locking device for each operating-lever having a portion adapted to engage one of the circuit-controllers, and a locking-out train for moving said locking devices into position to mechanically hold the operating-levers and to open the circuit-controllers, substantially as described.

20. In a repeater, a repeating-train, a locking-lever therefor, a series of operating-levers, one for each circuit connected with the repeater, responsive to changes therein, movement of any one of which will release said train, a series of circuit-controllers, one for each circuit adapted to be opened and closed at each operation of the repeating-train, and an independent locking device for each operating-lever having a portion adapted to engage one of the circuit-controllers, and a locking-out train for moving said locking devices into position to mechanically hold the operating-levers, and retain them in such position until the end of a signal, and to engage and raise one of the contacts of the circuit-controllers, and retain it in elevated position until the end of a signal, substantially as described.

21. In a repeater, a repeating-train, locking-lever therefor, and a series of operating-levers, one for each circuit connected with the repeater, movement of any one of which will operate said locking-lever, independently-movable locking devices, one for each operating-lever, a repeating circuit-controller for each circuit, a portion of each locking device adapted when said locking device is in locking position to engage one member of one of the circuit-controllers, and thus open the circuit, and a locking-out train for moving said locking devices into locking position and retaining them there until the close of the message, substantially as described.

22. In a repeater, a repeating-train, locking-lever therefor, and a series of operating-levers, movement of any one of which will operate said locking-lever, independently-movable locking devices, one for each operating-lever, consisting of pivoted levers normally held by said operating-levers in a position to be engaged by a cam operated by a locking-out train, a projection on said lever adapted when the lever is engaged and moved by said cam to engage and hold the said operating-lever, and a portion of said lever adapted to engage one member of a circuit-closer at the repeater, and thus open the circuit belonging to the said lever through the repeater, substantially as described.

23. In a repeater, a series of normally-closed circuit-controllers, one for each circuit connected therewith, a series of operating-levers, a series of controlling-levers governed by said operating-levers, which when operated open all of said circuit-controllers except the one connected with the operating-circuit, and hold them open until the end of a signal, and also mechanically hold the corresponding operating-levers, and a repeating-train responsive to the operating-circuit for successively closing the circuit-controllers thus opened, and means for closing said circuit-controllers a predetermined time after the repeating-train has ceased to operate, and in case of a broken circuit to also mechanically hold the operating-lever of said circuit, substantially as described.

24. In a repeater, a series of circuit-controllers, one for each circuit adapted to be opened and closed at each operation of the repeating-train, and a series of controlling-levers governing the operative positions of said circuit-controllers, a locking-out train with which said controlling-levers coöperate, a series of operating-levers governed by electromagnets in the circuits, any one of which releases the repeating-train for each impulse, substantially as described.

25. In a repeater, a series of normally-closed circuit-controllers, one for each circuit connected therewith, a series of controlling-levers for said circuit-controllers which when operated engage one member of and separate it from the other member of the said circuit-controller, and thereby open all of said circuit-controllers except the one connected with the operating-circuit, means for thus operating the controlling-levers, and for holding them open until the end of the signal, and a repeating-train responsive to the operating-circuit for successively and momentarily closing the circuit-controllers thus opened, substantially as described.

26. In a repeater, a repeating-train, a locking-lever therefor, a series of operating-levers movement of any one of which will operate said locking-lever, a locking-out train adapted to be released by the repeating-train, a normally-closed circuit-controller for each circuit, means operated by the locking-out train for opening said circuit-controllers at the beginning of a message and retaining them normally open until the end of said message, and an actuator for momentarily closing the said circuit-controllers at each operation of the repeating-train, whereby the circuit-controllers of the receiving-circuits are open at the beginning of the signal and produce the repeated signal by momentary closures, substantially as described.

27. In a repeater, a series of circuit-controllers normally in inoperative condition, a repeating-train responsive to the operating-circuit for operating them to repeat a signal when they are placed in operative condition, a series of controlling-levers for placing all of said circuit-controllers in operative condition to be operated by the repeating-train except the one connected with the operating-circuit, a locking-out train for operating said controlling-levers, and a series of operating-levers which determine which controlling-lever shall be operated by the locking-out train, substantially as described.

28. In a repeater, an operating-lever for each circuit adapted to respond to changes therein, a repeating-train adapted to operate in response to a movement of any of said operating-levers, and a locking-out train adapted to restore said operating-levers to their normal positions, as set forth.

29. In a repeater, an operating-lever for each circuit adapted to respond to changes therein, a repeating-train adapted to operate in response to a movement of any of said operating-levers, a locking-out train controlled by said repeating-train, and independently-movable devices, one for each operating-lever, adapted to be operated by the said locking-out train to restore said operating-levers to their normal positions, substantially as described.

30. In a repeater, an operating-lever for each circuit adapted to respond to changes therein, a repeating-train adapted to operate in response to a movement of any of said operating-levers from its normal position, a locking-out train controlled by said repeating-train and having an initial and a final movement, and independently-movable devices one for each operating-lever adapted to be operated by the final movement of said locking-out train to restore said operating-levers to their normal positions, substantially as described.

31. In a repeater, a number of operating-levers, each having a locking device adapted to be operated by a locking-out train common to all, said locking-out train being adapted by its initial movement to lock all the operating-levers except the one belonging to the operating-circuit, and a repeating-train adapted by its first operation to release said locking-out train and permit it to make its initial movement and by its subsequent operations to repeat the signal over the other circuits, and restoring mechanism consisting of a train adapted to be wound up at each operation of said repeating-train, and a device carried by said train adapted to arrest and hold said locking-out train in position to lock said operating-levers until said train has run down, the final movement of said locking-out train thus released restoring the locking devices to their normal position, substantially as described.

32. In a repeater, a repeating-train, a locking-lever therefor adapted by its movement from a normal to an abnormal position to permit said train to start and to then arrest and hold said train, and an operating-lever for each circuit adapted when said circuit is open to move said locking-lever from its normal to its abnormal position, and retain it there with the train arrested until said operating-lever is restored to its normal position, substantially as described.

In testimony whereof I have signed my name to this specification in the presence of two subscribing witnesses.

FREDERICK W. COLE.

Witnesses:
B. J. NOYES,
EVA S. ROUNDS.